(12) United States Patent  
Haustein et al.

(10) Patent No.: US 7,529,932 B1  
(45) Date of Patent: May 5, 2009

(54) REMOVABLE MEDIUM AND SYSTEM AND METHOD FOR WRITING DATA TO SAME

(75) Inventors: Nils Haustein, Soergenloch (DE); Daniel J. Winarski, Tucson, AZ (US); Craig A. Klein, Tucson, AZ (US); Frank Krick, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,887

(22) Filed: Mar. 31, 2008

(51) Int. Cl.  
*H04L 9/00* (2006.01)

(52) U.S. Cl. .................. 713/166; 713/167; 726/26; 726/27; 726/28; 726/29; 726/30

(58) Field of Classification Search .............. 726/26, 726/27, 28, 29, 30; 713/166, 167  
See application file for complete search history.

(56) References Cited

U.S. PATENT DOCUMENTS

| | | | |
|---|---|---|---|
| 6,643,777 | B1 | 11/2003 | Chu |
| 6,968,459 | B1 | 11/2005 | Morgan et al. |
| 7,047,407 | B2 * | 5/2006 | Itoh et al. .................. 713/168 |
| 7,210,043 | B2 * | 4/2007 | Miyazaki et al. ............ 713/193 |
| 2002/0174369 | A1 * | 11/2002 | Miyazaki et al. ............ 713/202 |
| 2003/0105979 | A1 * | 6/2003 | Itoh et al. .................. 713/201 |
| 2003/0163717 | A1 | 8/2003 | Yoshimoto et al. |
| 2004/0243734 | A1 * | 12/2004 | Kitagawa et al. .............. 710/13 |
| 2005/0015592 | A1 * | 1/2005 | Lin ............................. 713/166 |
| 2006/0066902 | A1 | 3/2006 | Matsui et al. |
| 2006/0218646 | A1 * | 9/2006 | Fontijn ......................... 726/27 |
| 2006/0242150 | A1 | 10/2006 | Jogand-Coulomb et al. |
| 2007/0236718 | A1 * | 10/2007 | Yokomura et al. ......... 358/1.13 |

FOREIGN PATENT DOCUMENTS

JP 2006-344212 12/2006

* cited by examiner

*Primary Examiner*—David Garcia Cervetti

(57) ABSTRACT

A method of a computer system controlling writing of data to a removable medium includes communicating a unique identification (ID) of the removable medium to the computer system, intercepting a write operation to the removable medium, communicating with a security server via a network interface and a network, sending the unique ID of the removable medium along with a list of data files being written, and determining if the data files are allowed to be written to the removable medium using the security server. The determination includes determining a security level of the data files, determining a security level of the removable medium based on the unique ID, determining if the security level of the data files is higher than the security level of the removable medium, and sending a message to the computer system via the network and instructing the computer system to allow or prevent writing the data files. The data files are allowed to be written to the removable medium if the security level of the data files is equal or lower than the security level of the removable medium. The data files are prevented from being written to the removable medium if the security level of the data files is higher than the security level of the removable medium.

1 Claim, 3 Drawing Sheets

REMOVABLE MEDIUM AND SYSTEM AND METHOD FOR WRITING DATA TO SAME

BACKGROUND OF THE INVENTION

1. Field of the Invention

The present invention relates to a removable medium having a unique ID and more particularly to a system and method which allows or prevents writing data to that removable medium based on the security level of the medium and the security level of the data.

A removable medium—such as removable disk, tape, optical or flash memory—has the intrinsic capability to be transported within and beyond a boundary. This has advantages because data can be transported from one stationary computer system to another. But it is also an increasing threat for enterprises because a removable medium also allows stealing of data and introduction of undesired data such as viruses.

Therefore a system and method is required allowing or preventing to write certain data to a removable medium.

2. Description of the Related Art

Some operating systems have conventional applications possessing the capability to enable or disable the use of a removable medium from writing, reading and deleting data. However, these conventional applications use methods that either entirely disable or entirely enable the ability to write to a removable medium. Respectfully, these methods will either restrict the ability to write any data to a removable medium, making the medium ineffective for any writing, no matter how benign, or completely enable the ability to write any data to a removable medium, posing the threat that critical data such as patent disclosures can be written to the medium and transported secretly outside a company's facility.

There are also other conventional applications that run on computer systems that allow the writing of a subset of files to a removable medium. The subset is configured by an administrator of the computer system. However, the application writing the subset of files only runs on one computer system. Thus, if a company has hundreds of computer systems, the application must be configured and adjusted for each computer system individually which requires a lot of inconvenience and effort.

Therefore, a system and method is required allowing or disallowing the writing of files to a removable medium, based on the identification of the removable medium. The files which are allowed to be written to a particular removable medium can be configured at a central computer. This central computer controls the ability of hundreds of computer systems to write to the particular removable medium. In addition, the ability to write to the particular removable medium is configurable on a per-file basis.

SUMMARY OF THE INVENTION

In view of the foregoing and other exemplary problems, drawbacks, and disadvantages of the conventional methods and structures, an exemplary feature of the present invention is to provide a method and structure that automatically allow or prevent writing of data to a removable medium based on the security level of the medium and the security level of the data to be written on the medium.

According to an exemplary embodiment of the present invention, a method of a computer system controlling writing of data to a removable medium comprises communicating a unique identification (ID) of the removable medium to said computer system, said computer system connected to a network and comprising a network interface for connecting said computer system to a security server via said network, said security server having at least three security levels and comprising a first map for categorizing a file name pattern of data files with respect to one of said security levels, and a second map for categorizing said removable medium with respect to one of said security levels, a processor for running computing instructions of said computer system, a user interface connected to an input and screen device for allowing a user to interact with said computer system, Random Access Memory (RAM) for storing data and instructions, at least one Input/Output (IO) Interface for connecting one of a plurality of storage devices and a plurality of network devices, and a removable media interface for connecting said removable media to said computer system, intercepting a write operation to the removable medium, communicating with said security server via said network interface and said network, sending the unique ID of the removable medium along with a list of data files being written, and determining if the data files are allowed to be written to the removable medium using said security server, said determining comprising determining a security level of said data files, determining a security level of the removable medium based on said unique ID, determining if the security level of the data files is higher than the security level of the removable medium, and sending a message to said computer system via the network and instructing said computer system to allow or prevent writing the data files, wherein said data files are allowed to be written to said removable medium if the security level of said data files is equal or lower than the security level of the removable medium, and wherein said data files are prevented from being written to said removable medium if the security level of said data files is higher than the security level of the removable medium.

According to this exemplary aspect of the present invention, only data with the same or a lower security level as the removable medium is allowed to be written to the medium. All other data is prevented from being written.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
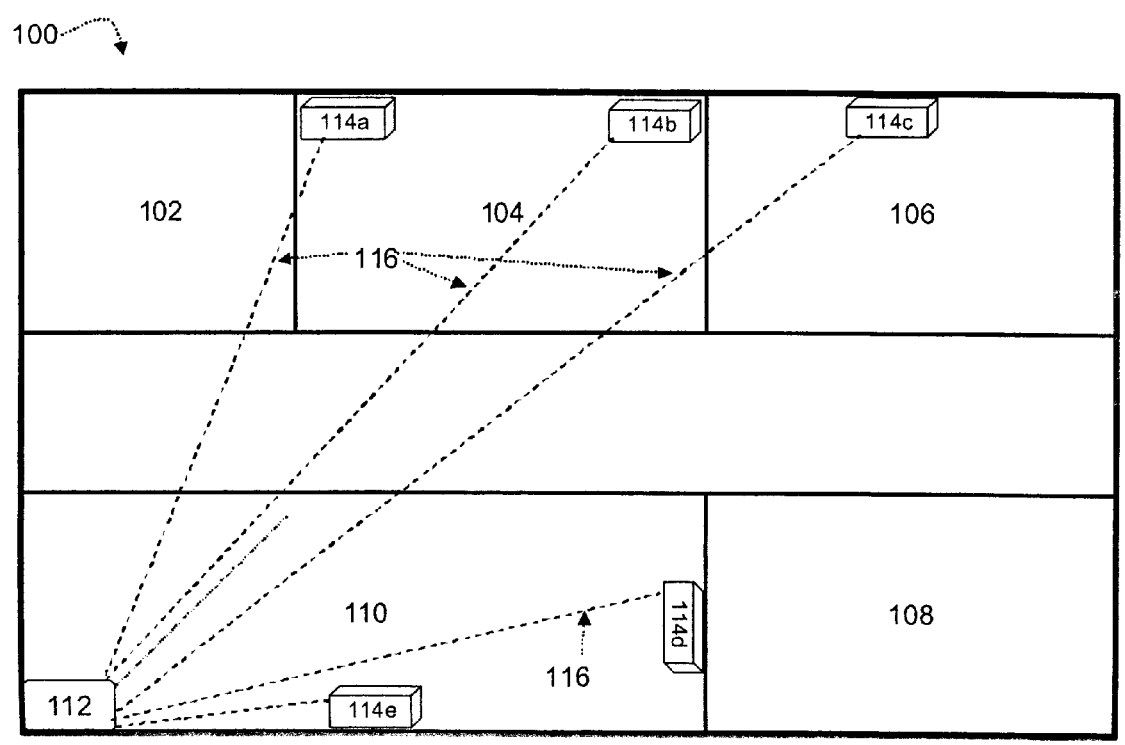
FIG. 1 illustrates an architecture of an office building with a plurality of computer systems and a security server.

Referring now to the drawings, and more particularly to FIG. 1, there are shown exemplary embodiments of the method and structures according to the present invention.

FIG. 1 illustrates an office building 100 including multiple rooms 102, 104, 106, 108 and 110. In these rooms, computer systems 114*a*-114*e* are installed. These computer systems are connected to a security server 112 via a network 116 which might be based on Ethernet or other conventional means of network communication. Computer systems 114*a*-114*e* in combination with the security server 112 provide the method to allow or prevent data to be written.

Figure 2:
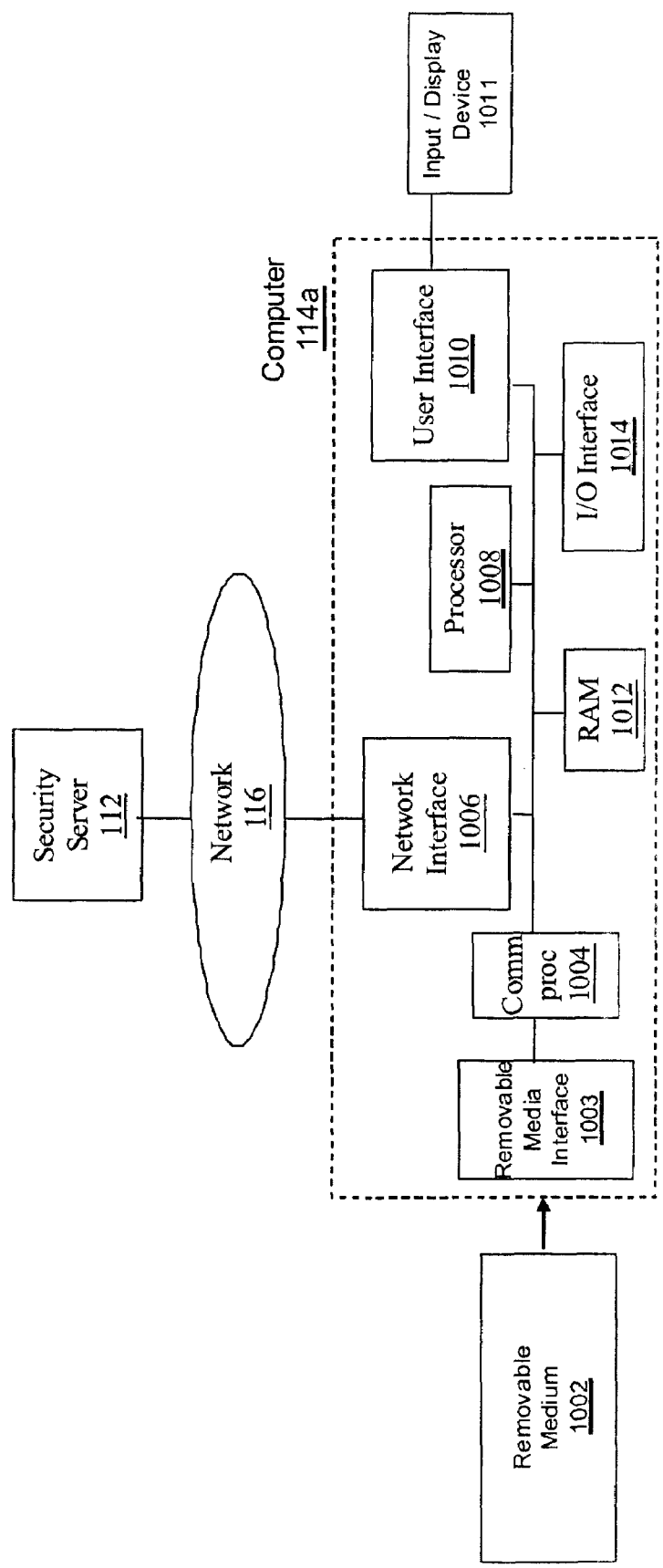
FIG. 2 illustrates a security server setup with respect to one of the computer systems.

FIG. 2 describes computer systems 114*a*-114*e* allowing to connect removable medium 1002. Exemplary computer system 114*a* includes common components such as a network interface 1006 for connecting the computer system to the security server 112 via network 116, a processor 1008 for running computing instructions, a user interface 1010 using an input and screen device 1011 for allowing the user to interact with computer system 114a, Random Access Memory (RAM) 1012 for storing data and instructions, and at least one Input/Output (IO) Interfaces for connecting other devices such as stationary disk devices or other networks.

Exemplary computer system 114a also includes a novel communication process 1004 for communicating with the security server 112 via network interface 1006 and network 116. Whenever a removable medium 1002 is connected to computer system 114a—more precise to the removable medium interface 1003—communication process 1004 reads the unique ID from the removable medium. Whenever data is written by the user to the removable medium 1002 connected to computer system 114a, communication process 1004 intercepts the write process and sends the list of file names and the unique ID of the removable medium to the security server 112 via network 116.

Figure 3:
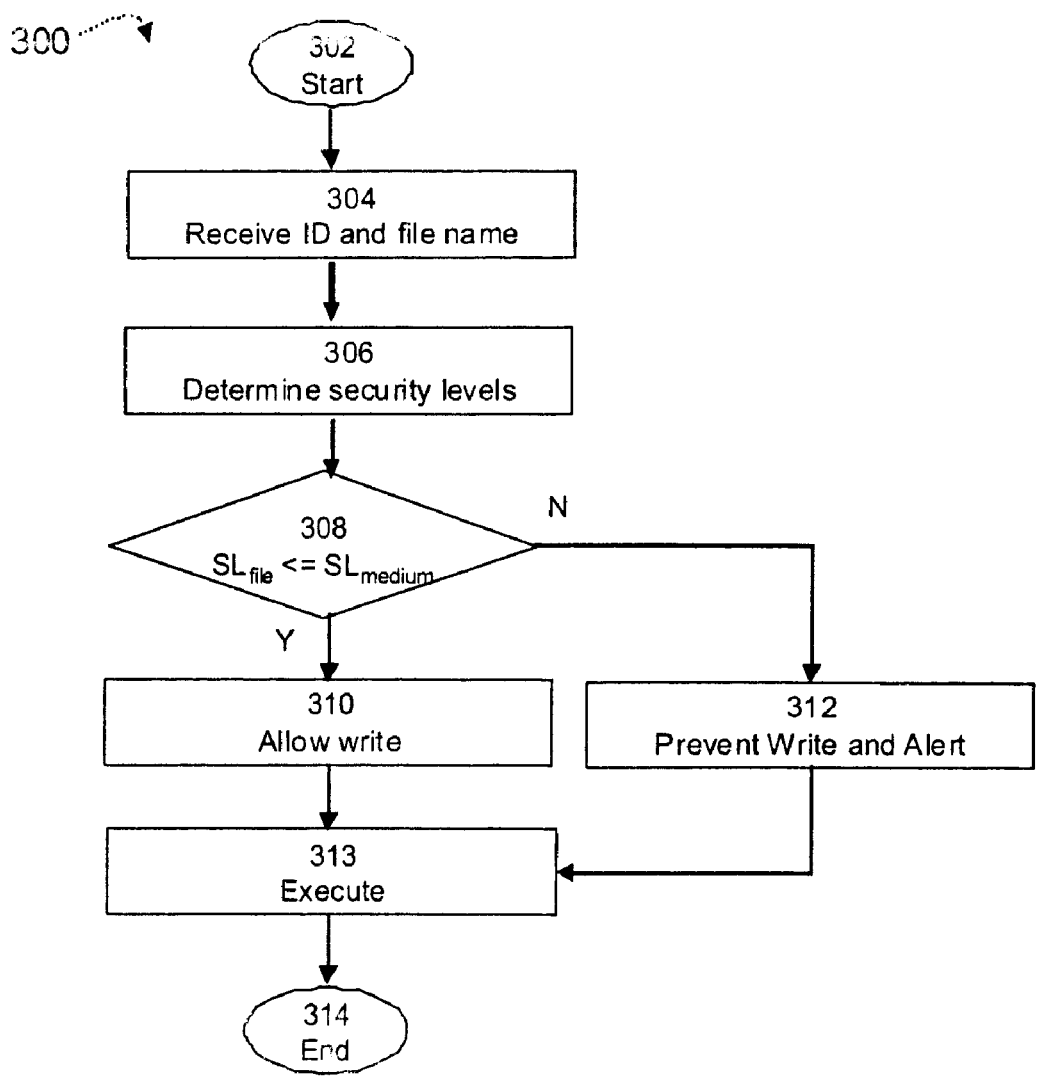
FIG. 3 illustrates a process to allow or prevent writing data to a removable medium.

Based on this information and the preconfigured security levels of the data files and the removable medium, the security server includes a method to determine to allow or prevent selected data to be written, as is exemplarily shown in FIG. 3.

When referring to data, the easiest way to describe it is by a file containing data. A file is denoted by a file name and other attributes such as a user name, a date and time of creation and modification, and a file type. However, the term data may also refer to collections of files such as directories or file systems. It may also refer to data which is not in a file but in data sets pertaining to a data base. In an exemplary embodiment, data is being explained based on files denoted by a file name and other unique attributes.

The security level of data files is preconfigured in the security server 112. The security server therefore maintains Table 1.

TABLE 1

Mapping file names to security level

| File Name Pattern (11) | Security Level (12) |
|---|---|
| c:\projectx\* | Confidential |
| c:\documents\* | Internal |
| c:\temp\* | Public |

Table 1 comprises two columns. In column 11, the file name pattern is configured which essentially represents the file and directory names of files stored locally in computer 114a. In column 12, the security level is configured which is applicable to the file name pattern 11 in that same row. In an exemplary embodiment, three security levels are defined whereby the highest level is "confidential", the medium level is "internal", and the lowest level is "public". People skilled in the art will appreciate that further security levels might be applicable.

For example, the second row of Table 1 can be interpreted that all files stored in directory c:\projectx of computer system 114a have a security level of "confidential". Likewise the third row of Table 1 says that all files stored in directory c:\documents of computer system 114a have a security level of "internal" and the fourth row of Table 1 says that all files stored in directory c:\temp of computer system 114a have a security level of "public".

In addition, security server 112 maintains a Table 2 which maps the ID of the removable medium 21 to the associated security levels 22.

TABLE 2

Mapping of removable medium ID to security level

| Removable Medium ID (21) | Security Level (22) |
|---|---|
| 123456789 | Confidential |
| 234567891 | Public |

Table 2 comprises two columns. The first column 21 specifies the unique ID of the removable medium and the second column 22 specifies the security level of the removable medium.

For example and referring to the second row of Table 2, the removable medium with the ID "123456789" has security level "confidential" allowing confidential data files (according to Table 1) to be written on this medium. The third row of Table 2 indicates that removable medium with ID "234567891" only allows writing files classified as "public" (according to Table 1) to it.

Ultimately, files with lower or equal security levels than the removable medium are allowed to be written to it as well. For example, on removable medium with ID "123456789", files classified as "public" can be written. However, on medium with ID "234567891", files classified as "internal" or "confidential" cannot be written. This is further explained in process 300 of FIG. 3.

Based on Table 1 and Table 2, the security server can implement a method to determine to allow or prevent writing data files to a removable medium based on the security level of the removable medium configured in Table 2 and the security level of the files configured in Table 1. This method is shown as process 300 in FIG. 3. This process 300 is implemented in security server 112 and it is invoked when a removable medium 1002 is connected to computer system 114a via removable media interface 1003 and when the user attempts to write files via user interface 1010.

FIG. 3 illustrates that process 300 starts in step 302 and continues to step 304 where communication process 1004 pertaining to computer system 114a sends the unique ID of the removable medium and the name of the files to be written to the medium to the security server 112 via network 116. The file names to be written might be selected by the user via the user interface 1011 of computer system 114a.

In step 306, the process determines the security levels of a) the file to be written and b) the removable medium. The security level of the file is determined using Table 1, whereby the file name is matched to column 11 and the associated security level is derived from column 12. If one or more files cannot be matched against Table 1, a default security level for the files is determined. The default security level for files can be preconfigured and might be set to "Confidential" according to an exemplary embodiment of the present invention. This ensures that all files which are not explicitly classified in Table 1 have the highest security level. The security level of the removable medium is determined using Table 2, where the removable medium ID is matched to column 21 and the associated security level is derived from column 22.

In step 308, the process determines if the security level of the file is equal or lower than the security level of the removable medium. If the answer in step 308 is yes, the security server informs the communication process 1004 that the write operation for the files is allowed in step 310. Otherwise, if the decision in step 308 is no, the security server informs the communication process 1004 that the write is prohibited in step 312.

From steps 310 and 312, the process continues to step 313 where the communication process 1004 according to computer system 114a informs the removable media interface 1003 that the write operation is allowed or prevented depending on the information obtained from the security server in step 310 or 312. The communication interface 1003 acts accordingly. In step 314, the process ends.

Based on the preconfigured constant security level of a removable medium subject, media might be allowed in certain geographical boundaries of the office building 300 in FIG. 3. For example, a removable medium with security level "confidential" might only be allowed in room 110 whereas a removable medium classified as "internal" might be allowed in the entire office 300 and removable medium classified as "public" can even be transported outside the office 300.

While the invention has been described in terms of several exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. A method of a computer system controlling writing of data to a removable medium, said method comprising:
   communicating a unique identification (ID) of the removable medium to said computer system, said computer system connected to a network and comprising:
       a network interface for connecting said computer system to a security server via said network, said security server having at least three security levels and comprising:
           a first map for categorizing a file name pattern of data files with respect to one of said security levels; and
           a second map for categorizing said removable medium with respect to one of said security levels;
       a processor for running computing instructions of said computer system;
       a user interface connected to an input and screen device for allowing a user to interact with said computer system;
       a Random Access Memory (RAM) for storing data and instructions;
       at least one Input/Output (IO) Interface for connecting one of a plurality of storage devices and a plurality of network devices; and
       a removable media interface for connecting said removable media to said computer system;
   intercepting a write operation to the removable medium;
   communicating with said security server via said network interface and said network;
   sending the unique ID of the removable medium along with a list of data files being written; and
   determining if the data files are allowed to be written to the removable medium using said security server, said determining comprising:
       determining a security level of said data files;
       determining a security level of the removable medium based on said unique ID;
       determining if the security level of the data files is higher than the security level of the removable medium; and
       sending a message to said computer system via the network and instructing said computer system to allow or prevent writing the data files,
   wherein said data files are allowed to be written to said removable medium if the security level of said data files is equal or lower than the security level of the removable medium, and
   wherein said data files are prevented from being written to said removable medium if the security level of said data files is higher than the security level of the removable medium.

* * * * *